United States Patent [19]
Bellanger et al.

[11] Patent Number: 6,129,187
[45] Date of Patent: Oct. 10, 2000

[54] PTO SHAFT MONITORING AND CONTROL SYSTEM

[75] Inventors: Regis Bellanger, Berthecourt; Yvon Le Clezio, Beauvais, both of France

[73] Assignee: Agco SA, Beauvais, France

[21] Appl. No.: 08/967,509

[22] Filed: Nov. 11, 1997

[30] Foreign Application Priority Data

Nov. 15, 1996 [GB] United Kingdom .................... 9623784

[51] Int. Cl.$^7$ .................................................. B60K 41/22
[52] U.S. Cl. ........................... 192/3.58; 74/11; 74/DIG. 7
[58] Field of Search ........................ 192/3.58; 74/DIG. 7, 74/335, 11; 477/97; 73/117.3; 701/50

[56] References Cited

U.S. PATENT DOCUMENTS

| | | | |
|---|---|---|---|
| 4,191,270 | 3/1980 | Monteith | 74/11 X |
| 4,344,499 | 8/1982 | Van der Lely et al. | 192/3.58 X |
| 4,722,234 | 2/1988 | Greene et al. | 74/15.4 |
| 4,747,301 | 5/1988 | Bellanger | 73/117.3 |
| 4,854,433 | 8/1989 | Tellert | 192/3.58 X |
| 5,083,647 | 1/1992 | Bulgrien | 192/3.58 |
| 5,251,733 | 10/1993 | Falck et al. | 192/3.58 X |
| 5,283,738 | 2/1994 | Schwab et al. | 192/3.58 X |
| 5,416,700 | 5/1995 | Bates et al. | 192/3.58 X |
| 5,454,432 | 10/1995 | Clezio | 701/50 X |
| 5,494,142 | 2/1996 | Kale | 192/12 C |

*Primary Examiner*—Rodney H. Bonck
*Assistant Examiner*—Ha Ho
*Attorney, Agent, or Firm*—MacMillan, Sobanski & Todd, LLC

[57] ABSTRACT

A monitoring and control system for a tractor having a power-take-off (PTO) shaft comprises inductive sensors (9, 11) associated with toothed wheels (8, 10) on the input and output shafts respectively of a PTO gearbox (5). Each type of PTO shaft will carry a toothed wheel having a different number of teeth, and thus the ratio between the frequencies of the signals generated by the sensors (9, 11) is indicative of the type of PTO shaft and the ratio engaged in the PTO gearbox. This information can then be displayed on a control/monitoring unit (14) and also used to automatically control the engagement rate of a PTO clutch (6).

9 Claims, 2 Drawing Sheets

PTO SHAFT MONITORING AND CONTROL SYSTEM

BACKGROUND OF THE INVENTION

The present invention relates to an electronic monitoring and/or control system for a utility vehicle, such as an agricultural tractor, equipped with a power-take-off (PTO) shaft or shafts.

PTO shafts are provided on eg agricultural tractors as a source of power for an implement mounted on or towed by the tractor, as is well known. The shaft protrudes from the rear of the tractor, and often a further shaft from the front. It is formed with splines at its protruding end to enable a rotary driving connection to be made with an implement.

Several standard types of PTO shaft are generally available, of different diameter and having different numbers of splines. Implements will generally be designed to be compatible with one or more of these standards. Each standard type also has a specific speed or speeds at which it is designed to be driven.

Generally, a tractor will be built with one type of shaft fitted and this may simply be retained for the life of the tractor. However, it is also frequently necessary to change PTO shaft type to accommodate different implements. When one shaft is substituted for another, if the design operating speed is different, the new shaft may be installed so that it is in driving connection with a different ratio in a PTO gearbox. This enables different design PTO speeds to be achieved with the same optimum engine revs. A cab mounted control may also be provided for changing the PTO gear ratio so that the design speed is achieved at lower engine revs for economy (eg for driving a light implement).

A problem with PTO shafts generally is the control of the rate at which drive to the PTO is engaged. Operating a switch on the tractor engine/transmission electronic control unit will engage drive to the PTO by automatically engaging a PTO clutch at a given rate. If an implement is fitted whose driven parts have a lot of inertia or for any other reason require a lot of power to get up to speed, the PTO output shaft can be heavily loaded. A particularly vulnerable part is the splines which may be damaged if the shaft is too heavily loaded. The maximum desirable loading for the PTO shaft will of course depend upon the type of shaft and normally the rate of engagement of the PTO clutch would have to be set so that the least robust type of output shaft ratio will not be overloaded at a high PTO ratio. This results in more robust types of shaft being engaged much more slowly than necessary.

It is an object of the present invention to alleviate the above problems and also to provide a greater degree of automation and operator awareness of the PTO function with consequent increased safety and convenience.

SUMMARY OF THE INVENTION

According to a first aspect of the invention, an electronic monitoring system for a vehicle having a PTO shaft includes means for automatically sensing the type of PTO shaft fitted to the vehicle.

According to a second aspect of the invention, an electronic control system is provided for a vehicle having a PTO shaft, comprising:
  (a) means for generating a first signal representative of the type of PTO shaft fitted to the vehicle, and
  (b) means for automatically setting, in response to the said signal, the parameters of a control routine for engaging drive via a PTO clutch to the PTO shaft.

Preferably, means are also provided for generating a second signal representative of the gear ratio between the drive and PTO shaft and the automatic setting means is responsive to both the first and second signals.

These first and second signals may comprise manual inputs, but preferably are provided by a monitoring system according to the first aspect of the invention.

According to a third aspect of the invention, an electronic control system is provided for a vehicle having a PTO shaft comprising:
  a) means for generating a first signal representative of the type of power-take-off shaft fitted to the vehicle;
  b) means for directly or indirectly generating a third signal representative of the torque on the power-take-off shaft;
  c) means responsive to the said first and third signals for controlling the degree of engagement of a power-take-off clutch associated with said power-take-off shaft.

Again, preferably means are also provided for generating a second signal representative of the gear ratio between the drive and PTO shaft and the means for controlling the degree of engagement of the PTO clutch is responsive to the first, second and third signals.

In either the second or third aspects outlined above, the said first and second signals may be constituted by a single electronic signal representative of both shaft type and gear ratio.

DETAILED DESCRIPTION

Figure 1:
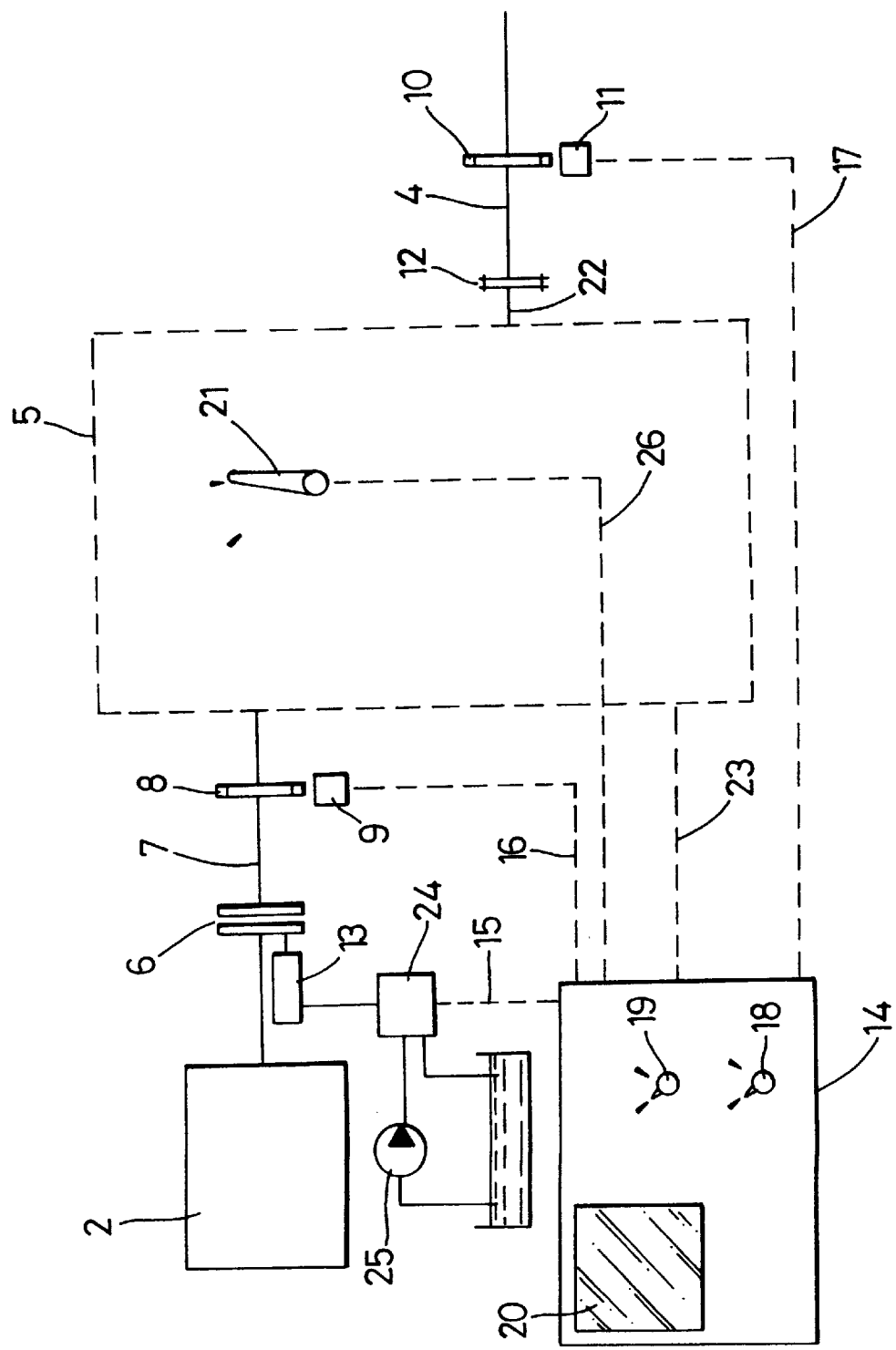
FIG. 1 is a highly schematic representation of the principle components of a system in accordance with the invention.
Figure 2:
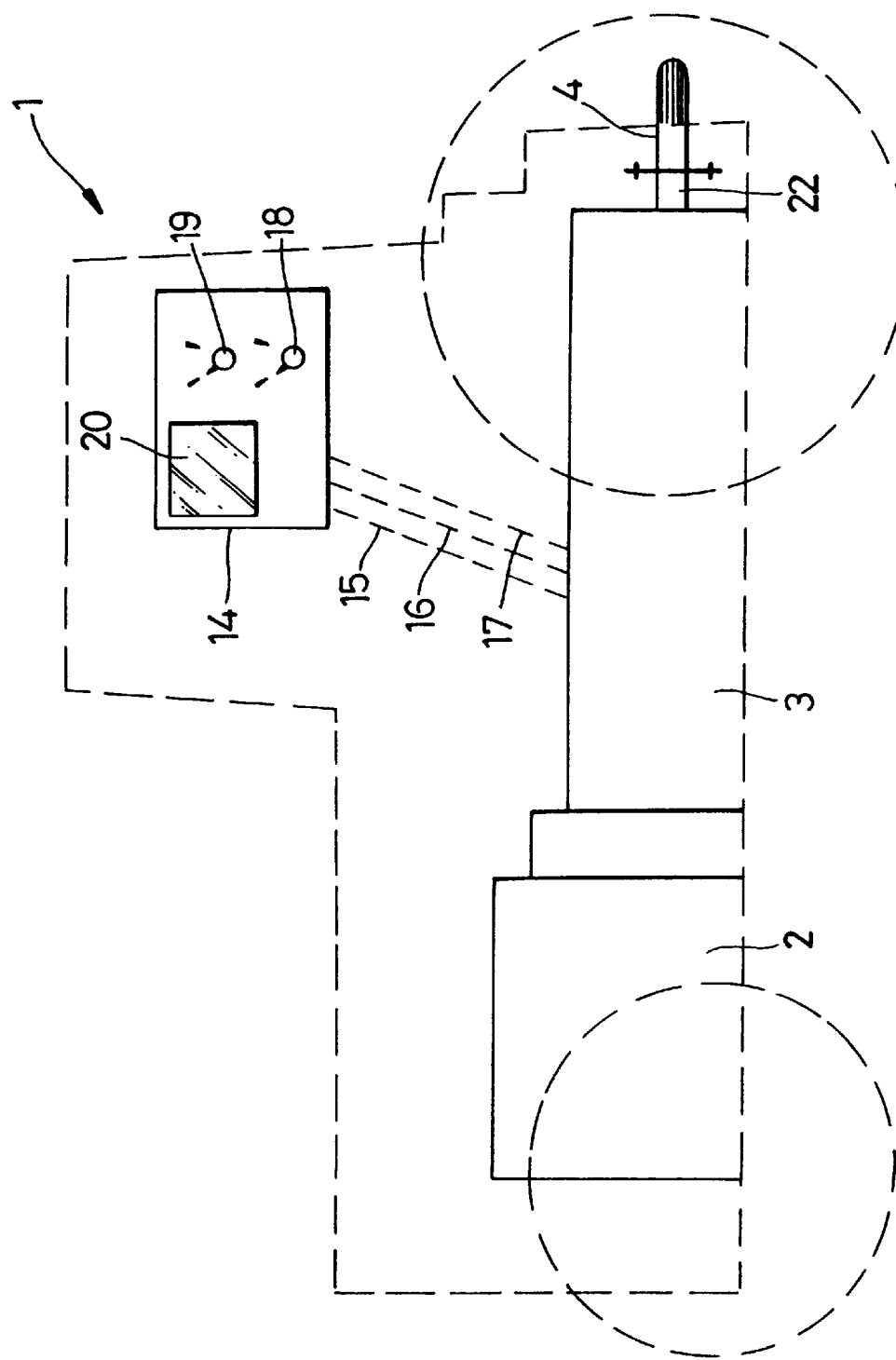
FIG. 2 is a schematic representation of an agricultural tractor incorporating a system in accordance with the invention.

Referring to FIGS. 1 and 2, an agricultural tractor 1 comprises an engine 2 and transmission 3. From the rear of the tractor 1 extends a power take-off (PTO) shaft 4, drivingly connected into the transmission 3. The transmission 3 includes a PTO gearbox 5 and a PTO clutch 6 via which the PTO shaft 4 is connected to the engine 2.

A PTO gearbox input shaft 7 extends between the PTO clutch and the PTO gearbox 5. Mounted on the PTO input shaft 7 is a toothed wheel 8 adjacent which is an inductive sensor 9. The output of the inductive sensor 9 will be a pulsed electronic signal whose frequency is the product of the rotation speed of the shaft 7 and the number of teeth on the toothed wheel 8. This type of device is relatively well known for electronically sensing the speed of rotation of shafts.

Mounted on the PTO shaft 4, is another toothed wheel 10 adjacent which is another inductive speed sensor 11.

The PTO shaft 4 is connected directly to the PTO gearbox output shaft 22 by means of plates welded to the end of each shaft which are bolted together to form a joint 12.

On the side of the PTO gearbox 5, accessible from the rear of the tractor in use, is a lever 21 for changing the gear ratio.

A cab mounted control/monitoring unit 14 includes a screen display 20 and a manual control 18 to select between engaged and disengaged states of the PTO. Also provided on the control unit 14, although it could equally well take the form of a directly acting mechanical lever, is a switch 19 for selecting between "normal" and "economy" modes for driving the PTO. In effect this means engaging different gears in the PTO gearbox such that the desired PTO shaft revs are achieved either by the usual 2000 rpm engine speed or a lower, 1550 rpm, engine speed.

Electronic signal lines 16, 17 carry signals from the inductive sensors 9, 11 respectively to the control/monitoring unit 14. Output signal line 15 connects the control/monitoring unit 14 to an electro-hydraulic valve 24 which in turn controls the supply of hydraulic fluid from a source 25 to a hydraulic cylinder 13 for actuating the PTO clutch 6.

An output signal line 23 from the control/monitoring unit 14 extends into the PTO gearbox for controlling an electro-hydraulic gear change system of known type for actuating the ratio change between "normal" and "economy" modes.

The PTO shaft 4 is interchangeable and to substitute a different type of shaft all that is required is to unbolt the joint 12 and then bolt on the new shaft. Different types of shafts will carry different toothed wheels 10. In practice there are three alternative types of PTO shaft which are identified by the number of cannelations or splines at the distal end and by the shaft diameter. A 1⅜" six splines shaft will have a toothed wheel with nine teeth; a 1¾" shaft with twenty splines, a wheel with eleven teeth and a 1⅜" shaft with twenty-one splines, a thirteen toothed wheel.

There are two standard PTO speeds, 540 rpm and 1000 rpm. Any implement designed to be driven by a PTO shaft will be designed to accept one or more of the above described shafts at a given rpm. In practice twenty and twenty-one spline shafts are only designed to operate at 1000 rpm. Six splines shafts are designed to operate at 540 rpm but can be operated at 1000 rpm.

The lever 21 on the side of the PTO gearbox is for shifting the ratio in the gearbox to provide either 540 or 1000 rpm at the output shaft 22. The ratio provided by the PTO gearbox may also be altered from the control/monitoring unit 14 by means of the "normal"/"economy" control 19 which selects the engine rpm needed to produce the required speed on the PTO output shaft 22.

As will be appreciated from the above, there are a number of factors affecting the PTO output speed. Up until now, PTO speed has only been monitored from the PTO gearbox input shaft 7 using a device such as the toothed wheel 8 on the shaft 7 and an inductive sensor 9. Normally, the shaft 7 is connected either directly or in a fixed ratio to the engine output, so the signal is effectively representative of engine rpm. The operator therefore has to be aware of the position of the lever 21, the type of shaft fitted and whether "economy" or "normal" mode has been selected in order mentally to calculate the speed of the PTO output shaft.

It will be appreciated that the use of a toothed wheel and inductive sensor on the PTO shaft itself potentially enables the control/monitoring unit 14 directly to detect and to display to the operator the PTO shaft speed. In the present system, however, the control/monitoring unit 14 calculates the ratio between the frequency of the signal from the inductive sensor 9 associated with the PTO input shaft and the frequency of the signal from the sensor 11. It will be understood that a pulsed signal representative of engine revs could be derived in a number of other ways known in the art, and used to derive the ratio in the same way. The precise value of the ratio is influenced by the gear ratio between the PTO input shaft 7 and output shaft 22 and also by the type of PTO shaft 4, since each type of PTO shaft carries a toothed wheel 10 with a different number of teeth.

Since there are a limited number of values for the number of teeth on the toothed wheel 10 and for the ratio between the input and output of the PTO gearbox 5, there are necessarily a number of unique values for the ratio between the frequencies of the signals from the inductive sensors 9, 11, each of these unique values representing a particular type of PTO shaft and a particular PTO gearbox ratio.

The control/monitoring unit 14 incorporates a microprocessor with a look-up table stored in memory to which it can refer to determine which type of PTO shaft is fitted and what the current ratio is between the input and output of the PTO gearbox. Consequently the unit 14 can also calculate and display the PTO shaft revs based on the engine revs (normally the revs on PTO input shaft 7, or at least a fixed factor thereof). The following table illustrates possible values for the ratio of the frequencies of the signals generated by inductive sensors 9 and 11 for different shaft types, engine speeds, etc.

| Shaft Types | Pulses/rev (ie teeth on wheel) | Design PTO rpm | Pulses at design PTO revs (× 1000) | Engine Speed at design PTO revs | Engine pulses at design PTO revs (× 1000) | Ratio |
|---|---|---|---|---|---|---|
| 1⅜" - 6 splines | 9 | 540 | 4.86 | 2000 | 20.00 | 4.12 |
|  |  |  |  | 1550 (eco) | 15.50 | 3.19 |
| 1⅜" - 6 splines | 9 | 1,000 | 9.00 | 2000 | 20.00 | 2.22 |
|  |  |  |  | 1550 (eco) | 15.50 | 1.72 |
| 1¾" - 20 splines | 11 | 1,000 | 11.00 | 2000 | 20.00 | 1.82 |
|  |  |  |  | 1550 (eco) | 15.50 | 1.36 |
| 1⅜" - 21 splines | 13 | 1,000 | 13.00 | 2000 | 20.00 | 1.54 |
|  |  |  |  | 1550 (eco) | 15.50 | 1.19 |

The display of PTO speed, together with whether "economy"/"normal" mode is selected, an indication of shaft type, etc on the screen 20 is an extremely useful function in its own right. However, the control/monitoring unit 14 also uses this information to set parameters for the engagement of the PTO clutch.

The simplest way in which the control/monitoring unit 14 can sense and display PTO shaft parameters and use them to control engagement of the PTO clutch 6 is as follows. When the tractor electronics are first started up, the control/monitoring unit 14 is effectively "unaware" of any PTO shaft parameters. When the PTO engagement switch 18 is activated to engage the PTO clutch 6, the unit 14 will govern this engagement using a default routine which will be gentle enough to ensure that there is no damage to the PTO shaft, whatever type is fitted and whatever the current ratio in the PTO gearbox.

After a very short interval, once the input and output shafts 7 and 22 are rotating, the unit 14 can derive the ratio of frequencies from sensors 9 and 11 and thereafter display shaft type information on the screen 20. Control parameters for the PTO clutch 6 will be set in dependence on the shaft type and these will be used for any subsequent engagement, and possibly also disengagement, of the PTO clutch until the tractor electronics are next switched off.

In addition to the above, the unit 14 can determine from the ratio of signals from sensors 9, 11 which of the gear ratios selected by the lever 21 is engaged (ie whether the PTO is operating on a "desired" 540 rpm speed or a "desired" 1000 rpm speed) and this information can be displayed on the screen 20 and also taken into account in setting the clutch engagement parameters. Again after the first PTO clutch engagement following start-up of the tractor electronics, these parameters would be set in the unit 14.

As an alternative, if the system is equipped with an electronic sensor to sense the position of the lever 21, the unit could use a signal on line 26 from that sensor to display whether the PTO is in 540 rpm or 1000 rpm mode and take this information into account when setting the clutch control parameters.

In a similar manner, the position of the "economy"/"normal" switch 19 which is itself mounted on the unit 14 can be displayed on the screen 20 and/or taken into account when setting the control parameters for engagement of the PTO clutch 6.

In an alternative embodiment, the ratio of the frequencies of the signals produced by the sensors 9, 11 could be redetermined each time the PTO clutch 6 starts to be engaged. The ratio is unaffected by the slip in the clutch 6 and therefore so long as the shafts 7 and 22 are moving at all, it is possible to derive the ratio. In this embodiment, there is no need to sense the position of the lever 21 or the switch 19 since this may be derived directly from the ratio. These two pieces of information together with the information on the shaft type again derived from the ratio of the signals from sensors 9, 11 can then be used to set control parameters for the remainder of the engagement of the PTO clutch 6.

In yet another alternative embodiment, a value or values representative of the type of PTO shaft fitted could be input manually into the control unit 14 and used automatically to set the clutch engagement parameters, optionally also influenced by electronic signals representative of the position of the lever 21 and the switch 19.

In an embodiment in which only the type of PTO shaft is sensed from the shaft itself, as opposed to the type of shaft and its rotational speed being sensed, many types of indicia could be used on the shaft, eg a bar code or other optically detectable indicia, a physical formation on the shaft, magnetically stored information etc.

Even if both the type and speed of the shaft are to be sensed, there are many other possible formations or indicia which could be used on the shaft which would produce an oscillating or pulsed signal. Such a signal could be combined then with an oscillating or pulsed signal representative of engine revs to produce a frequency ratio indicative of type and speed of shaft and the ratio in the PTO gearbox.

Finally, another embodiment is envisaged in which the torque on the PTO shaft is sensed and this information used continuously to control the rate of engagement of the PTO clutch in a feedback loop. This would be in addition to using the information about shaft type, and normally also in addition to the information about gearbox ratio.

Direct sensing of PTO torque is difficult, but engine torque can be derived from so called "maps" of engine parameters given data on engine revs, turbo boost, etc. PTO torque could then be derived from engine torque given data on PTO gearbox ratio and losses in the PTO gearbox, etc.

In this embodiment, the torque on the PTO shaft could be continuously monitored to ensure that it did not exceed a maximum—not only during start up. If a maximum were to be exceeded, the PTO clutch could be slipped to reduce the torque or an alarm sounded, etc.

What is claimed is:

1. A power-take-off adapted to be connected between a source of rotational power and a driven implement, said power-take-off comprising:

an input shaft adapted to be rotatably driven by the source of rotational power, said input shaft including a portion having a plurality of elements provided thereon;

an output shaft adapted to rotatably drive the driven implement, said output shaft being selected from a plurality of output shafts, each including a portion having a plurality of elements provided thereon;

a gearbox for selectively connecting said input shaft to rotatably drive said output shaft at any one of a plurality of gear ratios;

a first sensor that is responsive to rotation of said elements provided on said input shaft thereby for generating a first signal;

a second sensor that is responsive to rotation of said elements provided on said output shaft for generating a second signal; and a controller that is responsive to said first and second signals for determining a physical characteristic associated with the output shaft.

2. The power-take-off defined in claim 1 further including a clutch connected to said input shaft that is adapted to selectively connect said input shaft to the source of rotational power.

3. The power-take-off defined in claim 2 wherein said controller is responsive to said determination of said physical characteristic for determining an engagement rate of the clutch.

4. The power-take-off defined in claim 1 wherein said controller is responsive to said determination of said physical characteristic for preventing the amount of torque on the output shaft from exceeding a predetermined value.

5. The power-take-off defined in claim 1 wherein said controller determines a type of said output shaft.

6. The power-take-off defined in claim 1 wherein said controller determines a size of said output shaft.

7. The power-take-off defined in claim 1 wherein said controller determines a number of splines on said output shaft.

8. The power-take-off defined in claim 1 wherein said controller determines a size and a number of splines on said output shaft.

9. The power-take-off defined in claim 1 wherein said controller determines a gear ratio between said input shaft and said output shaft.

* * * * *